P. J. R. POSTEL-VINAY.
MAGNETO.
APPLICATION FILED JAN. 30, 1919.

1,334,675.

Patented Mar. 23, 1920.

Inventor
Pierre Jean René Postel-Vinay

By Laurence Langner
Attorney

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTÈME CANTON-UNNE), OF BILLANCOURT, SEINE, FRANCE.

MAGNETO.

1,334,675.  Specification of Letters Patent.  Patented Mar. 23, 1920.

Application filed January 30, 1919. Serial No. 274,100.

*To all whom it may concern:*

Be it known that I, PIERRE JEAN RENÉ POSTEL-VINAY, citizen of the Republic of France, residing at 46 Boulevard de la Tour-Maubourg, Paris, Seine, in the Republic of France, have invented new and useful Improvements in Magnetos, of which the following is a specification.

This invention relates to improved means for assembling the rotary inductors with the end supports in magnetos provided with rotary inductors. Heretofore, the segmental inductors are as a rule secured to the end supports or heads of the rotor, which are made of a non-magnetic metal, by means of an annular slot formed in the inner face of the head, the ends of the inductors engaged and centered in said slot. Centering pins and screws are used to hold the members suitably assembled. The above method of assembling the said parts is objectionable. At high speed and owing to vibrations, it happens that the screws which have a reduced diameter by reason of the reduced thickness of the inductors are lengthened whereby the whole rotor is subject to distortion and comes into engagement either with the polar pieces or the fixed armature. Sometimes, the screws are broken and the pieces become entangled between the moving parts whereby the apparatus is soon out of working condition.

This invention relates to an improved device for securing the inductors upon the end supports in which the periphery of the end supports is preferably provided with an annular shoulder which is engaged into a corresponding slot formed in the inner periphery of the inductors and the intervening spacing members, which inductors and spacers are provided with a cone shaped outer surface over which is forced a nut screwed upon the end member and provided with a correspondingly shaped cone surface. The whole structure is thus rigidly assembled and may be taken apart very easily. The above arrangement may be used in magneto rotors having any number of segmental inductors.

In the annexed drawing given by way of example:

Figure 1:
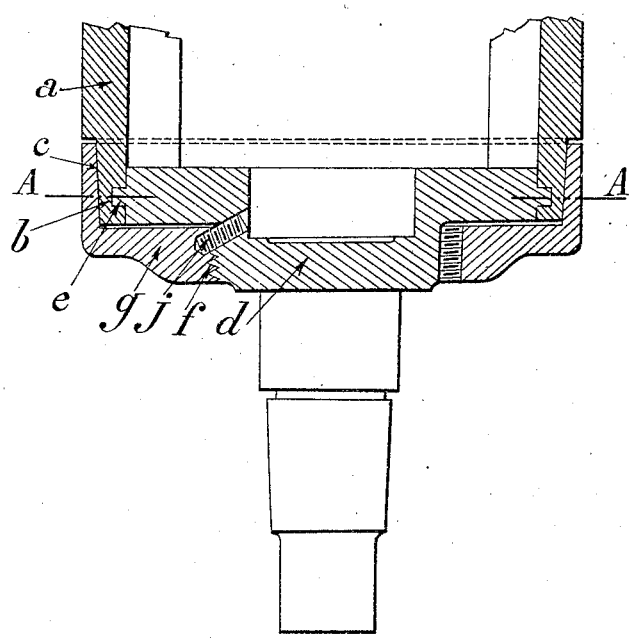
Figure 1 is a longitudinal partial section showing the inductors and one end support assembled together.
Figure 2:
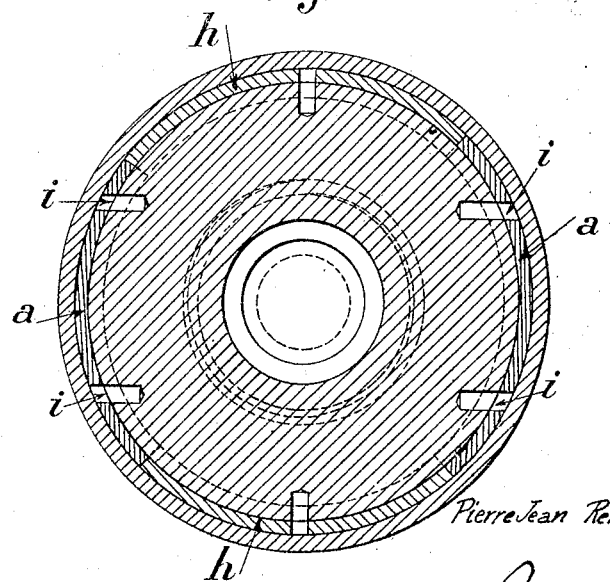
Fig. 2 is a cross section along the line A—A, Fig. 1.

As shown in the drawing, the segmental inductors $a$ are provided in their inner periphery, near the ends, with an annular slot $b$ and the outer surface of their ends has a cone shaped part $c$. The head or end support $d$ is provided on its periphery with an annular shoulder $e$ having the same cross section as the slot $b$ and the boss of said head is threaded exteriorly at $f$. A nut $g$ is screwed upon said threaded portion $f$ of the head $d$. It is provided with a flange which is bored to the same cone as the cone shaped portion $c$ of the inductors. Spacers $h$ placed in the intervals between the segmental inductors are similarly provided with an inner peripheral slot and an outer cone surface.

As will be shown by reference to the drawing, the inductors $a$ and spacers $h$ are so placed that the inner slot $b$ thereof fits over the shoulder $e$ of the support $d$. The nut $g$ being screwed over the hub of support $d$, its flange is engaged and pressed by its inner cone surface over the cone shaped ends of inductors $a$ and spacers $h$ whereby the whole structure is held rigidly assembled, the different parts being prevented from separating by the interlocking engagement of the same.

The inductors are carried with the head member in the movement of rotation of the latter by reason of the frictional engagement between the cone parts of the nut flange and inductors but, if desired, the adherence may be increased by pins, screws or keys $i$ extending through the inductor and the head.

To prevent the nut from unscrewing, the same can be threaded in such a way that it has a tendency to be screwed on when the inductors rotate in the normal direction. A nut lock arrangement may also be provided, which may comprise screws or pins $j$ which are removable to permit dismounting and engage into the nut and the head either parallel to the axis of rotation or at an angle to said axis as shown in Fig. 1.

Having now described my invention, what I claim as new and desire to secure by Letters Patent is:

1. In a magneto with rotary segmental inductors, the combination of inductors, spacers arranged between said inductors, head members arranged at the ends of the inductors and spacers, means whereby the inductors and spacers are in interlocking engagement at each of their respective ends with the periphery of each of said heads separately and nuts screwed upon the heads and adapted to securely hold the respective ends of the inductors and spacers on the corresponding heads.

2. In a magneto with rotary segmental inductors, the combination of inductors, spacers arranged between said inductors, head members provided with a circular shoulder on their periphery and a central boss, the inductors and spacers having inner slots into which said circular shoulder is adapted to engage, and nuts screwed upon the central boss of the heads, said nuts being provided with an interiorly cone shaped flange adapted to frictionally engage corresponding cone shaped outer surfaces formed on the inductors and spacers.

In testimony whereof I have signed my name to this specification.

PIERRE JEAN RENÉ POSTEL-VINAY.